(12) United States Patent
Isayama et al.

(10) Patent No.: US 7,267,376 B2
(45) Date of Patent: Sep. 11, 2007

(54) TUBE JOINT FOR FUEL TANK

(75) Inventors: Akira Isayama, Saitama (JP); Hideki Matsumoto, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/049,936

(22) Filed: Feb. 4, 2005

(65) Prior Publication Data

US 2005/0184515 A1    Aug. 25, 2005

(30) Foreign Application Priority Data

Feb. 5, 2004   (JP) .............................. 2004-028736

(51) Int. Cl.
  *F16L 25/00* (2006.01)
(52) U.S. Cl. ................. 285/423; 285/141.1; 285/288.1
(58) Field of Classification Search ............. 285/141.1, 285/423, 288.1, 201, 239; 137/202, 43
See application file for complete search history.

(56) References Cited

U.S. PATENT DOCUMENTS 6,755,206 B2 *   6/2004   Nishi et al. ................. 137/202
7,014,214 B2 *   3/2006   Kaneko ................... 285/141.1
2002/0121517 A1   9/2002   Aoki et al.
2005/0029809 A1 *   2/2005   Kaneko ................... 285/288.1

\* cited by examiner

*Primary Examiner*—Aaron Dunwoody
(74) *Attorney, Agent, or Firm*—Arent Fox LLP

(57) ABSTRACT

A tube joint for a fuel tank includes a joint body having a tubular shape, and a barrier layer covering the inner surface of the joint body. The joint body is formed of a material which is weldable to a tank body, and the barrier layer is formed of a material which has fuel impermeability and a predetermined hardness. The barrier layer has an extension portion extending from a distal end of the joint body along an axial direction of the joint body. The extension portion includes a projecting portion which protrudes radially and outwardly of the extension portion at or adjacent to a proximal end of the extension portion such that a seal groove is formed between the projecting portion and the joint body, and a nail portion which protrudes radially and outwardly of the extension portion at or adjacent to a distal end of the extension portion.

7 Claims, 3 Drawing Sheets

TUBE JOINT FOR FUEL TANK

BACKGROUND OF THE INVENTION

The present invention generally relates to a tube joint for fuel tanks made of resin materials.

In recent years, plastic containers produced by blow molding have been used as a fuel tank of vehicles as they excel in rust preventative characteristics and weight reduction as well as their high productivity.

Various parts are attached to the tank body of the fuel tank through a tube joint. These parts include, for example, a vent valve, a check valve, and a fuel pump. The vent valve retains the internal pressure of the tank body at a certain level by discharging fuel evaporation gas that is held in a space above the oil level from the tank.

In the case where the tank body and the tube joint are both produced by the same kind of synthetic resin, such as high density polyethylene (hereinafter referred to as "HDPE"), they can be jointed by heat welding. This can simplify the manufacturing process of the fuel tank.

Since effusion of the fuel evaporation gas from the fuel tank causes air pollution, the tank body and its joint portion require low hydrocarbon permeability (hereinafter referred to as "fuel impermeability"). However, synthetic resin such as HDPE is relatively poor in fuel impermeability. For this reason, to restrict the permeation of hydrocarbon, it is considered to use so-called gasoline barrier materials having excellent fuel impermeability, such as ethylene-vinylalcohol copolymer (hereinafter referred to as "EVOH"). However, these gasoline barrier materials are poor in adhesion properties upon heat welding and difficult to satisfy the joint strength between the tank body and the tube joint.

To be more specific, the tube joint fixed to the tank body of the plastic fuel tank is preferably made of a material which has sufficient strength and rigidity, excellent gasoline swelling resistance and high fuel impermeability, and further which can be heat welded to the tank body. However, it is very difficult to produce this tube joint by a single material. Therefore, as disclosed in Japanese Laid-open Patent Application No. 2002-254938 (claim 1, paragraphs [0006] to [0010], and FIG. 1), the tube joint (weld joint for the fuel tank) is integrally formed by coinjection molding two kinds of resins.

FIG. 3 shows a sectional view partly and schematically showing a conventional tube joint of a fuel tank. As shown in FIG. 3, the tube joint 110 fixed to the tank body 100 of the fuel tank consists of a tubular joint body 120 and a barrier layer 130 for covering the inner surface of the joint body 120. The joint body 120 is made of a first resin material weldable to the tank body 100, and the barrier layer 130 is made of a second resin material that is adhesively and chemically reactive with the first resin material and that has better fuel impermeability than the first resin material. The barrier layer 130 is provided with an end portion 131 that protrudes from the distal portion 121 of the joint body 120. Upon injection molding the barrier layer 130 on the inner surface of the joint body 120, the end portion 131 is formed by the flow of the second resin material flowing from the proximal portion 122 of the joint body 120 that is fixed to the tank body 100 and through the distal portion 121. The end face 140 where the end portion 131 and the distal portion 121 are joined together does not dispose in the end for the flow of the second resin material, and the second resin material is welded at a high temperature to the joint body 120. This can provide a high degree of adhesive strength between the end portion 131 and the distal portion 121. The tube joint 110 formed as above allows the joint body 120 to be heat welded to the tank body 100 as well as decreases the fuel permeability of the barrier layer 130 that covers the inner surface of the joint body 120.

However, the above tube joint 110 has a drawback such that when a tube 150 is connected to the tube joint 110, the fuel within the tank body 100 permeates outside from a gap between the tube joint 110 and the tube 150 or water droplets enter into the tank body 100 from the gap. Further, if a sufficient adhesion is not obtained between the different kinds of resin materials, the adhered surfaces may be peeled, leading to the entry of water droplets into the tank body 100.

The tube 150 is inserted onto the end portion 131 of the tube joint 110 and thereafter engaged by a clamp by firmly clamping the outer periphery of the tube 150, so that the tube 150 is not pulled out from the tube joint 110. However, since the tube 150 is only supported between the two tubular surfaces, the tube 150 is pulled out relatively easily when it is pulled hard.

In view of the above, the present invention seeks to provide a tube joint of a fuel tank, which can firmly clamp the tube and which can provide a sufficient seal.

SUMMARY OF THE INVENTION

It is an aspect of the present invention to provide a tube joint for a fuel tank including: a joint body formed of a material which is weldable to a tank body, the joint body being tubular in shape; and a barrier layer covering an inner surface of the joint body, the barrier layer being formed of a material which has fuel impermeability and a predetermined hardness. In this tube joint, the barrier layer has an extension portion extending from a distal end of the joint body along an axial direction of the joint body, and the extension portion includes a projecting portion which protrudes radially and outwardly of the extension portion at or adjacent to a proximal end of the extension portion such that a seal groove is formed between the projecting portion and the joint body, and a nail portion which protrudes radially and outwardly of the extension portion at or adjacent to a distal end of the extension portion.

According to this tube joint, the seal groove is formed between the projecting portion of the extension portion and the joint body, so that a fluid-tight seal can be obtained between the joint body and the tube fitted onto the joint body. A fluid-tight seal can be obtained also at the contact surface between the extension portion and the joint body. Further, the nail portion provided at or adjacent to the distal end of the barrier layer that is formed of a material with a sufficient hardness can bite into the inner peripheral surface of the tube so as to prevent the tube from being pulled out from the tube joint. According to the present invention, since the joint body is weldable to the tank body, a firm welding can be obtained between the tube joint and the tank body. Further, since the barrier layer is formed of a material which excels in fuel impermeability, it is possible to prevent the fuel from permeating the tube joint.

Other features and advantages of the present invention will be apparent from the following description.

BRIEF DESCRIPTION OF THE DRAWINGS

The aspects of the present invention will become more apparent by describing in detail illustrative, non-limiting embodiments thereof with reference to the accompanying drawings, in which.

DETAILED DESCRIPTION OF THE INVENTION

With reference to the accompanying drawings, one preferred embodiment of the present invention will be described below.

Figure 1:
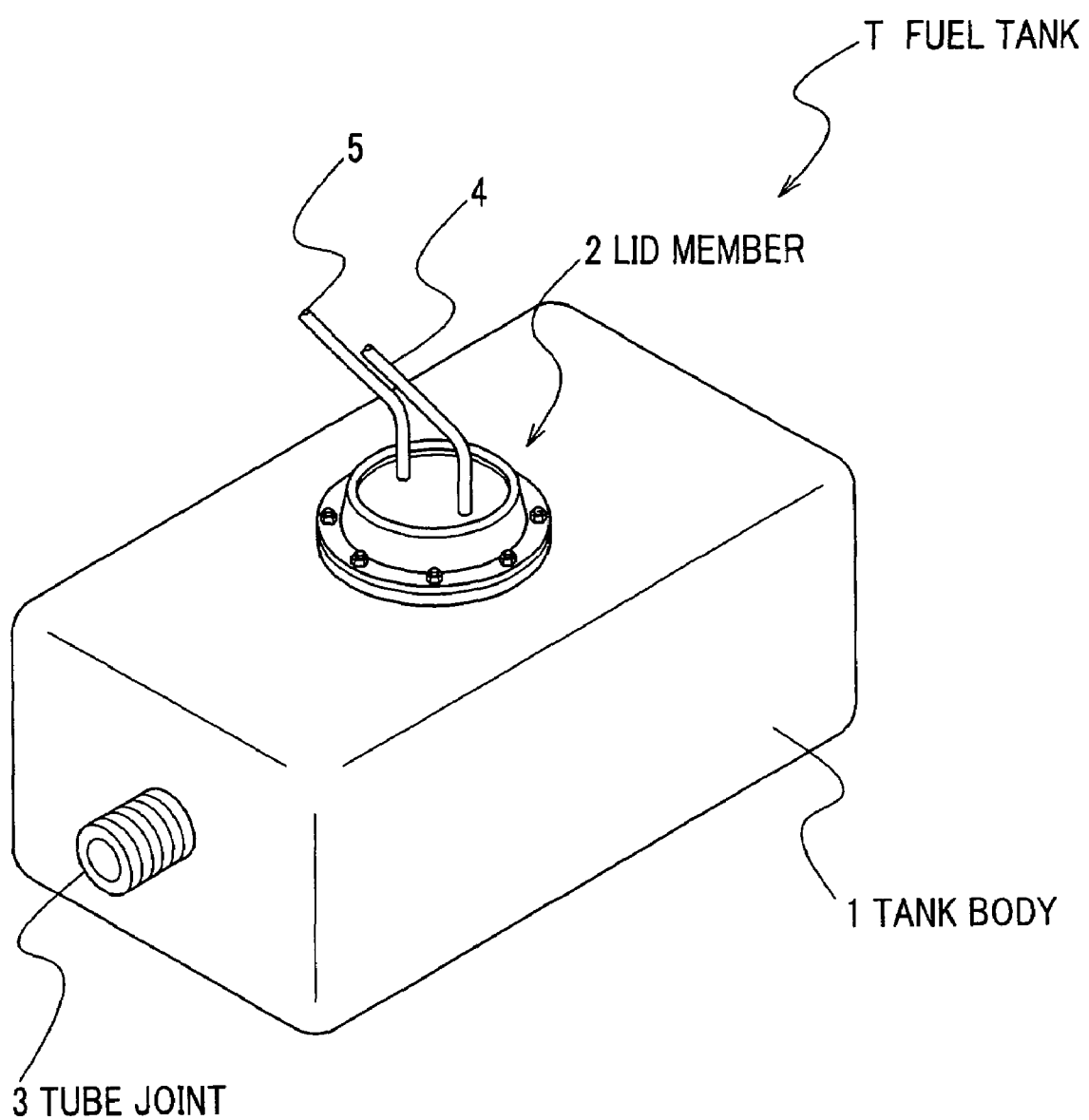
FIG. 1 is a perspective view of a fuel tank provided with a tube joint according to the present invention.

As shown in FIG. 1, a fuel tank T made of resin includes a resin tank body 1 for storing fuel, a lid member 2 for covering an opening of the tank body 1, and a tube joint 3 for connecting a tube 6 (see FIG. 2) that is further connected to an oil filler port of the vehicle body. In this embodiment, one end of the tube joint 3 which is attached to the tank body 1 is referred to as a proximal end, and the other end of the tube joint 3 is referred to as a distal end.

As shown in FIG. 1, a fuel supply passage 4 and a return passage 5 are integrally attached to the lid member 2. The fuel supply passage 4 is for supplying fuel from a fuel pump (not shown) arranged within the tank body 1 to an engine of the vehicle, and a return passage 5 is for recycling excess fuel from the engine.

Figure 2:
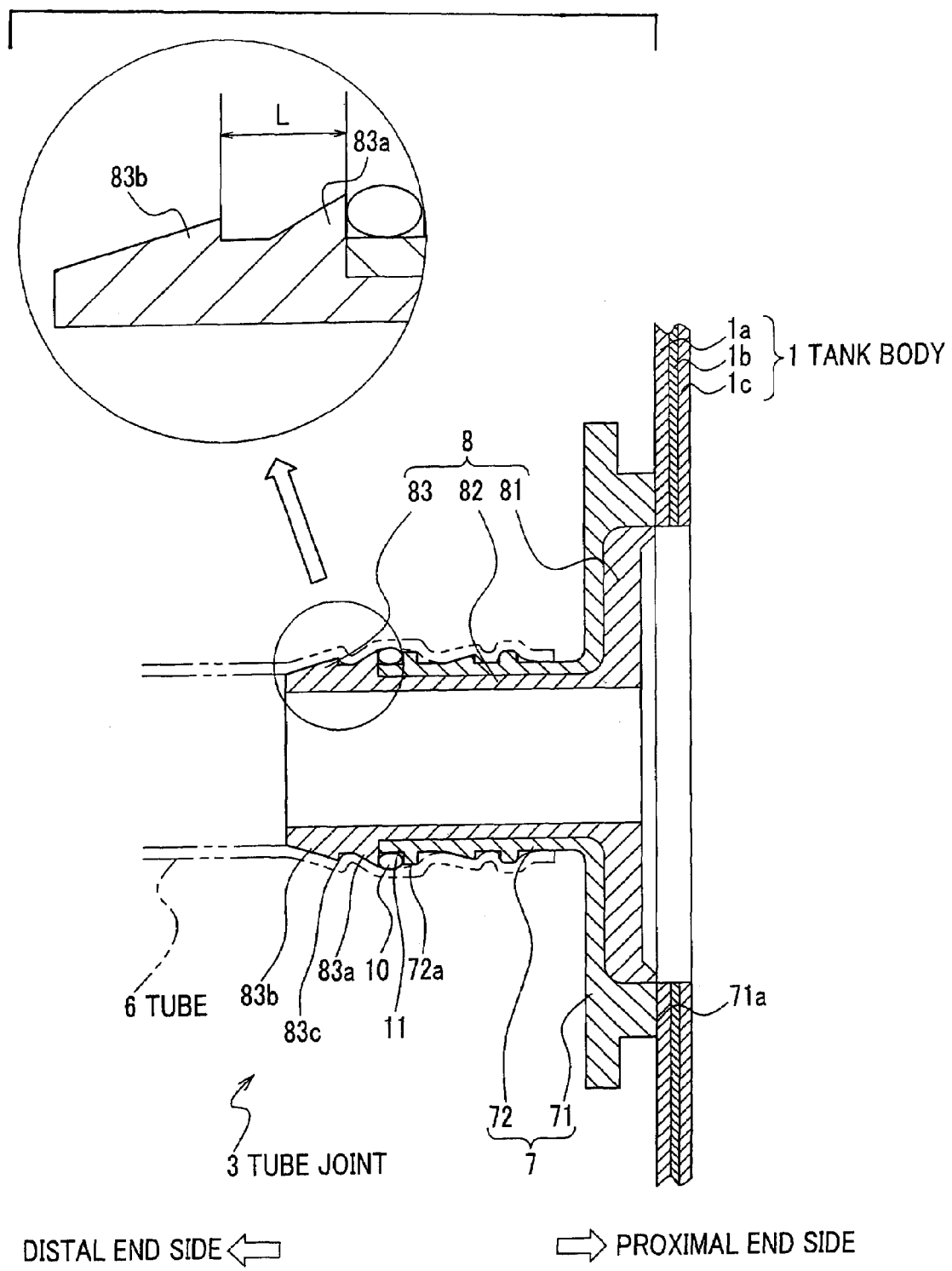
FIG. 2 is an enlarged sectional view illustrating a main part of the tube joint shown in FIG. 1.
Figure 3:
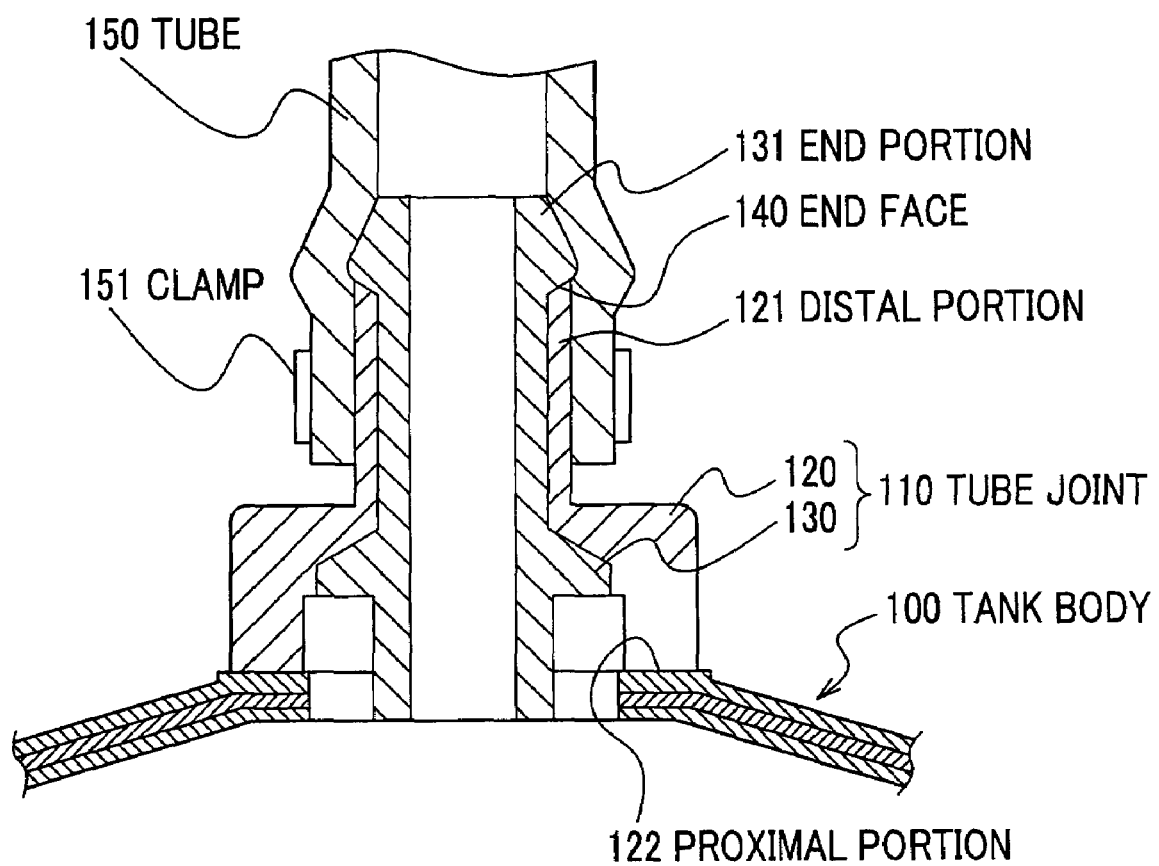
FIG. 3 is a sectional view illustrating a conventional tube joint.

As seen in FIG. 2, the tank body 1 is formed by blow molding and has a three-layered structure including an outer layer 1a as a surface layer, an inner layer 1c, and an intermediate layer 1b interposed between the outer layer 1a and the inner layer 1c. The outer layer 1a and the inner layer 1c are made of a weldable material, such as high density polyethylene (HDPE). The intermediate layer 1b is made of a material which excels in fuel impermeability, such as polyamide resin and polyacetal resin. Such a three-layered structure allows the outer layer 1a to be heat welded with other component parts that are made of the same kind of resin material as the outer layer 1a. Further, the intermediate layer 1b having excellent fuel impermeability can prevent the fuel within the tank body 1 from permeating outside the tank body 1.

As shown in FIG. 2, the tube joint 3 is fixed to the tank body 1 so as to protrude outwardly of the tank body 1. The tube joint 3 is a joint for connecting one end of the tube 6, the other end of which is connected to the oil filler port (not shown). The tube joint 3 consists of a joint body 7 which is heat welded to the tank body 1, and a barrier layer 8 which covers the inner peripheral surface of the joint body 7. The tube 6 connected to the tube joint 3 is made of an elastic material and has a diameter smaller than the outer periphery of the joint body 7.

The joint body 7 is made of a weldable material, such as HDPE. The joint body 7 includes a tubular portion 72 for connecting the tube 6, and a flange portion 71 formed at the proximal end of the tubular portion 72. The flange portion 71 is provided with a weld portion 71a axially extending from the flange portion 71, so that the joint body 7 can be heat welded to the outer layer 1a of the tank body 1 through the weld portion 71a. At a position slightly offset from the distal end of the tubular portion 72 is provided a projecting portion 72a which protrudes radially and outwardly of the tubular portion 72.

The barrier layer 8 is made of polyamide that has excellent fuel impermeability and high hardness. The barrier layer 8 includes a tubular portion 82 covering the inner peripheral surface of the tubular portion 72 of the joint body 7, a flange portion 81 continuously extending from the proximal end of the tubular portion 82 and covering the inner surface of the flange portion 71, and an extension portion 83 axially extending from the distal end of the tubular portion 72. As described above, the inner surface of the joint body 7 is entirely covered by the barrier layer 8 so as to prevent the fuel from permeating outside.

The extension portion 83 positions on the side where the tube 6 is inserted, and includes a projecting portion 83a which protrudes radially and outwardly of the extension portion 83 at or adjacent to the proximal end, and a nail portion 83b which also protrudes radially and outwardly of the extension portion 83 at or adjacent to the distal end. To be more specific, the projecting portion 83a and the nail portion 83b are formed such that they face to the inner peripheral surface of the tube 6. The projecting portion 83a and the nail portion 83b are tapered such that the diameter thereof increases gradually from the distal end toward the proximal end to ease the insertion of the tube 6 from the distal end side of the tube joint 3.

The projecting portion 83a is adjacent to the distal end of the tubular portion 72 of the joint body 7, and together with the projecting portion 72a it defines the seal groove 11 on the outer periphery of the tube joint 3. An O-ring is fitted onto the seal groove 11, so that a fluid-tight seal can be obtained between the tube 6 and the tubular portion 72. A fluid-tight seal can be obtained also at the contact surface between the projecting portion 83a and the distal end of the tubular portion 72, so that even if the adhered surfaces may be peeled, entry of water droplets into the tank body can be prevented. Various seal materials other than the O-ring 10 may be arranged on the seal groove 11.

The nail portion 83b bites into the inner peripheral surface of the tube 6 and prevents the tube 6 from being pulled out from the tube joint 3. To be more specific, since the nail portion 83b is made of polyamide that is a material having high hardness, when the nail portion 83b is press fitted into the tube 6 made of an elastic material and the tube 6 is reduced its diameter, the nail portion 83b firmly contacts with and bites into the inner surface of the tube 6 so as to prevent the tube 6 from being pulled out.

To prevent the pulling-out of the tube 6, it is preferable to set the distance L between the projecting portion 83a and the nail portion 83b to a certain amount. Being the distance L too short, the tube 6 does not wedge into the recess portion 83c formed between the projecting portion 83a and the nail portion 83b. Therefore, the nail portion 83b does not bite into the inner peripheral surface of the tube 6.

In order to reliably prevent the pulling-out of the tube 6, the outer periphery of the tube 6 may be firmly clamped by a clamp.

The tube joint 3 as previously described is formed by coinjection molding so that the joint body 7 and the barrier layer 8 are formed integral to each other. The joint body 7 and the barrier layer 8, which are made of different kinds of materials, can be firmly adhered by coinjection molding. Since both the joint body 7 and the outer layer 1a of the tank body 1 are made of HDPE, the tube joint 3 can be fixed to the tank body 1 by heat welding the joint body 7 to the outer layer 1a. Further, since the barrier layer 8 which entirely covers the inner peripheral surface of the joint body 7 is made of polyamide, fuel permeation from the tank body 1 can be prevented.

According to the tube joint 3 as described previously, various advantages can be obtained.

For example, when the tube 6 is connected to the tube joint 3, the end of the tube 6 is press fitted from the nail portion 83b side of the barrier layer 8. Since the nail portion 83b is formed as a taper gradually increasing its diameter from the distal end toward the proximal end of the extension portion 83, the nail portion 83b guides the tube 6 toward the proximal end of the extension portion 83 while enlarging the diameter of the tube 6. This can ease the connection of the tube 6 to the tube joint 3.

Further, the O-ring 10 to be fitted onto the seal groove 11 ensures a seal between the tube 6 and the tube joint 3. Since the seal groove 11 is formed by the projecting portion 83a and the projecting portion 72a, the O-ring 10 to be fitted onto the seal groove 11 also seals the adhered surfaces between the projecting portion 83a and the distal end of the tubular portion 72. Therefore, even if the projecting portion 83a (extension portion 83) is peeled from the distal end side of the tubular portion 72 to form a gap, it is possible to prevent water droplets and the like from entering into the tube joint 3 from the gap.

Furthermore, when the tube 6 is connected to the tube joint 3 and is reduced its diameter, the nail portion 83b made of a material having high hardness bites into the inner surface of the tube 6. Therefore, even if the tube 6 is pulled toward the distal end side of the tube joint 3, the nail portion 83b restricts the displacement of the tube 6 and thus prevents the pulling-out of the tube 6.

The tube joint 3 according to the above embodiment can be modified such that instead of providing only one nail portion 83b as described above, two or more nail portions 83b are provided along the axial direction of the extension portion 83. The plurality of nail portions 83b bite into the inner surface of the tube 6 to firmly restrict the displacement of the tube 6, which can prevent the pulling-out of the tube 6 in a more reliable manner.

Although the present invention has been described above with reference to a specific embodiment thereof, it is to be understood that various changes and modifications may be made without departing from the scope of the invention.

In the preferred embodiment, the tube joint 3 has been described for a tube connected to the oil filler port (so-called filler tube). However, the present invention can be adapted to a tube joint for connecting various kinds of tubes. The present invention may be used as a joint for connecting the fuel supply passage 4 or the fuel return passage 5.

What is claimed is:

1. A tube joint for a fuel tank comprising:
   a tank body;
   a tubular joint body formed of a material which is weldable to the tank body;
   a barrier layer covering an inner surface of the joint body, the barrier layer being formed of a material which has fuel impermeability and a predetermined hardness, the barrier layer having an extension portion extending from a distal end of the joint body along an axial direction of the joint body, the extension portion including a projecting portion which protrudes radially outward of the extension portion at or adjacent to a proximal end of the extension portion;
   a seal groove defined by an area formed between a proximal surface of the projecting portion of the barrier layer, an outer peripheral surface of the distal end of the joint body, and a distal surface of a projecting portion of the joint body; and
   a nail portion which protrudes radially outward of the extension portion at or adjacent to a distal end of the extension portion.

2. The tube joint according to claim 1, wherein the extension portion comprises a plurality of said nail portions along the axial direction of the joint body.

3. The tube joint according to claim 1, wherein the nail portion is formed as a taper gradually increasing a diameter along the extension portion from the distal end toward the proximal end of the extension portion.

4. The tube joint according to claim 1, wherein the projecting portion of the joint body protrudes radially outward of the joint body at or adjacent to a distal end of the joint body.

5. The tube joint according to claim 1, wherein the joint body further comprises an annular flange portion disposed at a proximal end of the joint body and including a weld portion axially extending therefrom.

6. The tube joint according to claim 1, further comprising an O-ring provided within the seal groove.

7. The tube joint according to claim 1, wherein the barrier layer further comprises a flange portion disposed at a proximal end of the barrier layer and a tubular portion connecting the extension portion of the barrier layer to the flange portion of the barrier layer.

* * * * *